No. 680,882. Patented Aug. 20, 1901.
J. H. McBRIDE.
CLOTHES LINE.
(Application filed Nov. 3, 1899.)
(No Model.)
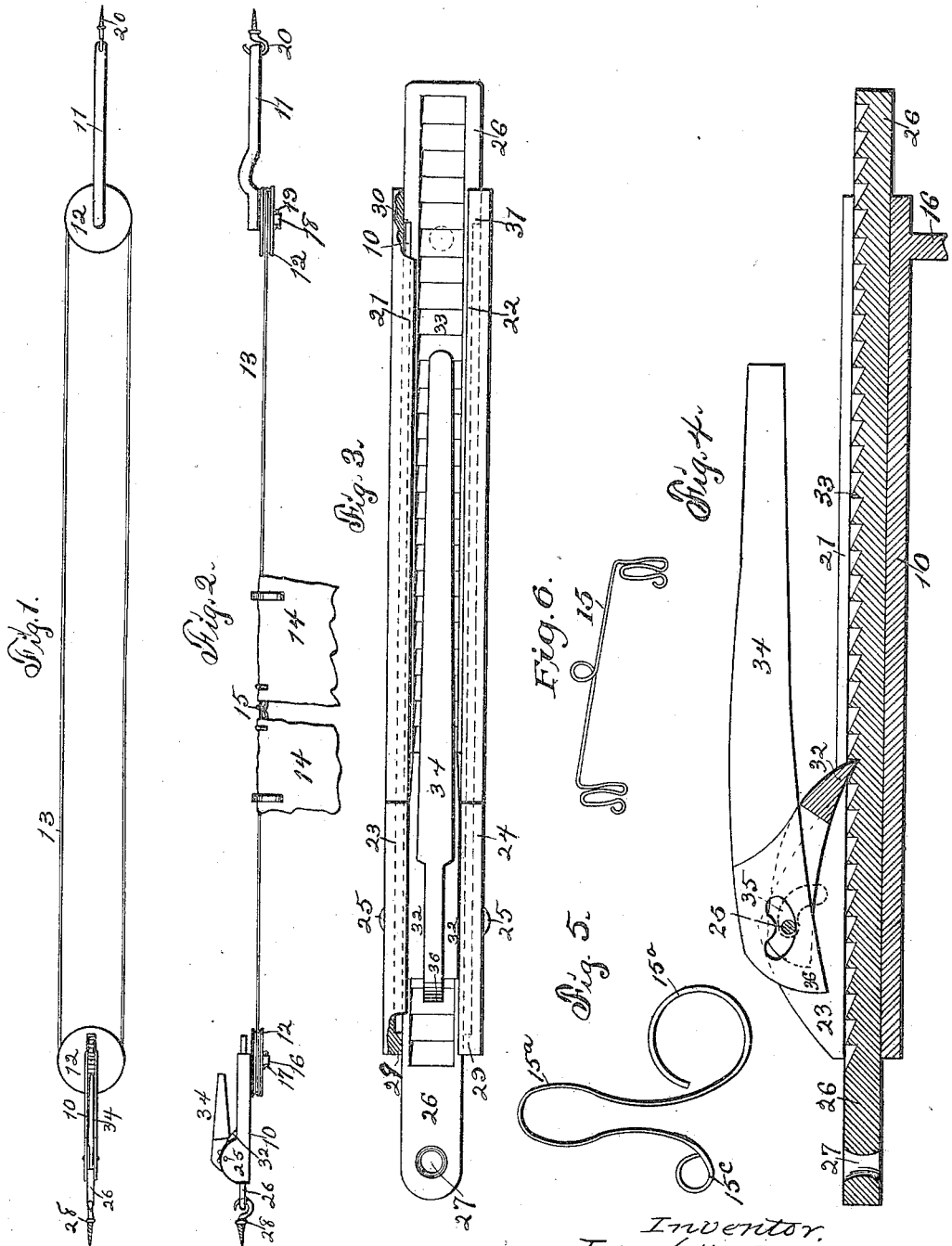
Attest:
R. G. Orwig.
Jas. Bards.
Inventor,
John H. McBride,
By J. C. Sweet
Atty
THE NORRIS PETERS CO., PHOTO-LITHO., WASHINGTON, D. C.

UNITED STATES PATENT OFFICE.

JOHN H. McBRIDE, OF DES MOINES, IOWA.

CLOTHES-LINE.

SPECIFICATION forming part of Letters Patent No. 680,882, dated August 20, 1901.

Application filed November 3, 1899. Serial No. 735,683. (No model.)

*To all whom it may concern:*

Be it known that I, JOHN H. MCBRIDE, a citizen of the United States of America, and a resident of Des Moines, Polk county, Iowa, have invented certain new and useful Improvements in Clothes-Lines, of which the following is a specification.

The object of this invention is to provide improved means for suspending an endless clothes-line, whereby said line may be tightened or loosened at the will of the operator through the manual actuation of mechanism carried thereby.

This invention consists in the construction, arrangement, and combination of elements hereinafter set forth, pointed out in my claims, and illustrated by the accompanying drawings, in which—

Figure 1 is a plan showing my improved hangers sustaining an endless clothes-line. Fig. 2 is an elevation of the same elements as shown in plan in Fig. 1. Fig. 3 is a detail plan, partly in section, of one of the hangers. Fig. 4 is a central longitudinal vertical section of the device shown in Fig. 3. Fig. 5 is a detail edge view of a pin designed for use with my clothes-line. In both Figs. 3 and 4 the grooved sustaining-wheel is removed. Fig. 6 is a detail view of a pin designed for use with my clothes-line.

In the construction and operation of the device as shown I employ two members or arms 10 11, each of which is provided with a grooved pulley or wheel 12, arranged and so shaped as to carry an endless clothes-line 13, to which line clothing or sections of fabric 14 may be attached by suitable pins 15 15ª. The pin 15 is made of a single length of wire formed with a central loop at right angles to its arms and downwardly-opening forks in the extremities of the arms. The pin 15 is carried by being strung on the line by the central loop, and the fabric is held to the line by embracement of the forks on the extremities of the arms of the pin. The pin 15ª is formed of bar metal bent as a yoke to embrace the line and fabric and provided with loops 15ᵇ 15ᶜ at its extremities, the loop 15ᵇ being of greater diameter than the loop 15ᶜ and so shaped as to admit the finger of the operator to place or remove the pin relative to the fabric or line.

The member or arm 10 is provided with an integral pin 16, formed on and projecting downwardly from one end portion thereof, and the wheel 12 is pivoted on said pin and retained by a split key 17, traversing the pin. The member or arm 11 is provided with an integral pin 18, formed on and extending downwardly from one end portion thereof, and a wheel 12 is pivoted on said pin and retained by a split key 19, traversing the same. The member or arm 11 is apertured in its end portion opposite to the pin 18, whereby attachment may be had to a screw-hook 20, arranged and shaped for insertion and mounting in a post, wall, or other suitable support. (Not shown.) The member or arm 10 is grooved longitudinally its entire length, and flanges 21 22 are formed on the upper edges of its sides and extend inwardly partially across the groove therein. Ears 23 24 are formed on and rise from one end portion of the sides of the arm or member 10, and a pin 25 is seated in said ears above the groove in the member. A ratchet-bar 26 is mounted slidingly in the groove and beneath the flanges 21 22 of the arm or member 10 and is provided with an eye or aperture 27 near one end, whereby attachment may be made to a screw-hook 28, arranged and shaped for seating and mounting in a post, wall, or other suitable support. (Not shown.) Lugs 29 29, one of which is shown by dotted lines in Fig 3, are formed on and extend inwardly from the sides of the arm or member 10 beneath the flanges 21 22 at the outer extremities of said flanges, and shoulders 30 31, the latter shown by dotted lines in Fig. 3, are formed on the ratchet-bar 26. The shoulders 30 31 engage the lugs 29 29 and limit the movement of the ratchet-bar relative to the arm or member 10. A detent 32 is pivoted on the pin 25 and engages one or another of the ratchet-teeth 33 on the ratchet-bar 26, thereby limiting, holding, and retaining the ratchet-bar. The detent 32 is bifurcated in its upper end portion, and a lever 34 is mounted with one end in the bifurcation thereof. The lever 34 is provided with a curved slot 35, approximately within the bifurcation of the detent 32, and said slot is traversed loosely by the pin 25. An engaging corner 36 is formed on the lever 34 and so shaped and arranged as that in the oscillation of the lever 34 manually the said corner will engage one or another of the ratchet-teeth 33 and advance the ratchet-bar 26 within the groove of the arm or bar 10, the slot 35 permitting a movement of the lever 34 across the pin 25 for the return of the engaging corner 36 after the advancement of the ratchet-bar, the said bar being held during the return of the engaging corner by the detent 32.

The arm or bar 11 is flexed or offset in its central portion to form a notch to permit the free passage thereunder of the pins, whereby the fabric or clothing is held to the line.

The screw-hooks 20 28 being mounted in any desired manner and the members or arms 10 11 carried thereon, the arm 10 carried through the medium of the bar 26, and a line 13 of endless form being mounted on the wheels 12, clothing or fabric may be attached to the line at any given point and the line advanced around the wheels. Through manual oscillation of the lever 34 the member 10 may be moved inwardly on the bar 26 to a considerable degree, resulting in a tightening or stretching of the endless line to the desired extent. The detent 32 may be lifted manually to release the ratchet-bar and slacken or loosen the endless line. The clothing or sections of fabric may be mounted on the line and retained by the pins 15 or 15ª, the operator occupying one position and feeding the line along as it is loaded, the clothing or sections of fabric passing around either or both of the grooved wheels 12 without damage or dislodgment.

I claim as my invention—

1. The wheels 12 carrying the endless line 13, a suitable pin mounted on the line 13, a member or arm 11 carrying one of the wheels 12 and suitably supported, a member or arm 10 carrying the other wheel 12, and a ratchet-bar carrying the member or arm 10 and suitably supported, and a pawl-and-ratchet mechanism connecting the arm 10 and the ratchet-bar.

2. In a device of the class described, the member longitudinally grooved and provided with flanges overlapping the groove therein, a wheel pivotally mounted on said member, the ratchet-bar mounted for movement longitudinally in the groove of said member, the lever pivoted on said member and the detent pivoted on said member and engaging the ratchet-bar.

3. In a device of the class described, a member provided with a pin 16, a ratchet-bar slidingly connected with said member, a lever pivoted on said member, and a detent pivoted on said member and engaging said ratchet-bar.

4. The clothes-line comprising the hanger member longitudinally grooved, the ratchet-bar slidingly mounted in said groove, lugs on the member within the groove thereof, shoulders on the ratchet-bar adapted for engagement with said lugs to limit and determine the relative movements of the bar and member in one direction, a lever pivoted on said member and adapted for engagement with the ratchet-bar, a detent pivoted on said member and adapted for engagement with the ratchet-bar, means for attaching a clothes-line to the member and another hanger to which the clothes-line also is attached.

5. In a device of the class described the member longitudinally grooved and provided with flanges overlapping the groove therein, a wheel pivotally mounted on said member, a ratchet-bar mounted for movement longitudinally in the groove of said member, the lever pivoted on said member, the detent pivoted on said member and engaging the ratchet-bar, the member 11 offset in its body portion, the wheel on said member 11 and having its periphery adjacent the offset portion thereof, the endless line on the wheels and the pins on the line.

Signed by me at Des Moines, Iowa, this 17th day of October, 1899.

JOHN H. McBRIDE.

Witnesses:
  S. C. SWEET,
  W. E. ELLIS.